United States Patent
Hsu

(10) Patent No.: US 9,431,836 B2
(45) Date of Patent: Aug. 30, 2016

(54) MOBILE POWER SUPPLY APPARATUS

(71) Applicant: Powergene Technology Co., Ltd., Taiwan Branch, New Taipei (TW)

(72) Inventor: Hui-Te Hsu, New Taipei (TW)

(73) Assignee: POWERGENE TECHNOLOGY CO., LTD. TAIWAN BRANCH, New Taipei (TW)

( * ) Notice: Subject to any disclaimer, the term of this patent is extended or adjusted under 35 U.S.C. 154(b) by 177 days.

(21) Appl. No.: 14/315,282

(22) Filed: Jun. 25, 2014

(65) Prior Publication Data

US 2015/0380962 A1    Dec. 31, 2015

(51) Int. Cl.
*H02J 7/00*    (2006.01)

(52) U.S. Cl.
CPC ........... *H02J 7/0044* (2013.01); *H02J 7/0054* (2013.01); *H02J 2007/0062* (2013.01)

(58) Field of Classification Search
CPC ..................................................... H02J 7/0044
See application file for complete search history.

(56) References Cited

U.S. PATENT DOCUMENTS

| | | | |
|---|---|---|---|
| 2006/0049695 A1* | 3/2006 | Tian .................... | H01M 2/1066 307/150 |
| 2014/0159639 A1* | 6/2014 | Miller .................. | H02J 7/0042 320/103 |

* cited by examiner

*Primary Examiner* — Vuthe Siek
(74) *Attorney, Agent, or Firm* — Chun-Ming Shih; HDLS IPR Services

(57) ABSTRACT

A mobile power supply apparatus includes a base and a main body. The base has a first socket and a second socket disposed adjacent to the first socket, and both sockets, are exposed from a side of the base. The main body is extended from the base, and the main body, the first socket and the second socket are disposed on the same side of the base, and the main body has a slot, and the first socket and the second socket are accommodated at the bottom of the slot to constitute a storage structure.

7 Claims, 5 Drawing Sheets

MOBILE POWER SUPPLY APPARATUS

FIELD OF THE INVENTION

The present invention relates to a mobile power supply apparatus, and more particularly to the mobile power supply apparatus with a storage structure.

BACKGROUND OF THE INVENTION

As the performance of mobile electronic devices becomes increasingly higher, the power consumption also increases accordingly. However, a built-in battery of the mobile electronic devices cannot increase the volume to enhance the battery capacity while maintaining the overall thin and light design. Therefore, a mobile power supply apparatus is a common solution for the power supply of the electronic device. When the mobile power supply apparatus supplies electric power, the mobile power supply apparatus and the mobile electronic device are connected with each other by a power cord, so that users have to carry the mobile power supply apparatus as well as the power cord. If the users forget to bring a power cord with them, then the mobile power supply apparatus cannot be used. Obviously, it is very inconvenient to the users.

In view of the foregoing problem, the inventor of the present invention based on years of experience in the related industry to conduct extensive researches and experiments to develop a mobile power supply apparatus in accordance with the present invention to overcome the problem of the prior art.

SUMMARY OF THE INVENTION

Therefore, it is a primary objective of the present invention to provide a mobile power supply apparatus with a storage structure.

To achieve the aforementioned objective, the present invention provides a mobile power supply apparatus comprising a base and a main body. The base has a first socket and a second socket disposed adjacent to the first socket, and both sockets are exposed from a side of the base, and the main body, the first socket and the second socket are disposed on the same side of the base, and the main body has a slot formed thereon, and the first socket and the second socket are accommodated at the bottom of the slot.

Preferably, the first socket and the second socket of the mobile power supply apparatus are of different specifications.

Preferably, the first socket and the second socket of the mobile power supply apparatus are substantially in a rectangular shape and the first socket and the second socket arranged parallel to each other.

Preferably, the main body of the mobile power supply apparatus includes a power storage unit electrically coupled to the first socket and the second socket.

Preferably, the base of the mobile power supply apparatus includes a first circuit board installed therein, and the first socket and the second socket are installed on the first circuit board, and the first circuit board is electrically coupled to the power storage unit.

Preferably, the main body of the mobile power supply apparatus includes a second circuit board installed therein and electrically coupled to the first circuit board, and the power storage unit is installed on the second circuit board.

Preferably, the first socket of the mobile power supply apparatus is plugged and connected to an electronic device.

Preferably, the mobile power supply apparatus further comprises an electric wire, and the electric wire includes a conductive wire, and a first plug and a second plug installed at both ends of the conductive wire respectively, and the first plug is plugged into the first socket, and the second plug is plugged into the second socket.

Preferably, the conductive wire of the mobile power supply apparatus is substantially in a flat shape.

Preferably, the conductive wire of the mobile power supply apparatus is folded and accommodated in the slot.

In the mobile power supply apparatus of the present invention, the first socket and the second socket are accommodated at the bottom of the slot to constitute a storage structure.

DESCRIPTION OF THE PREFERRED EMBODIMENTS

Figure 1:
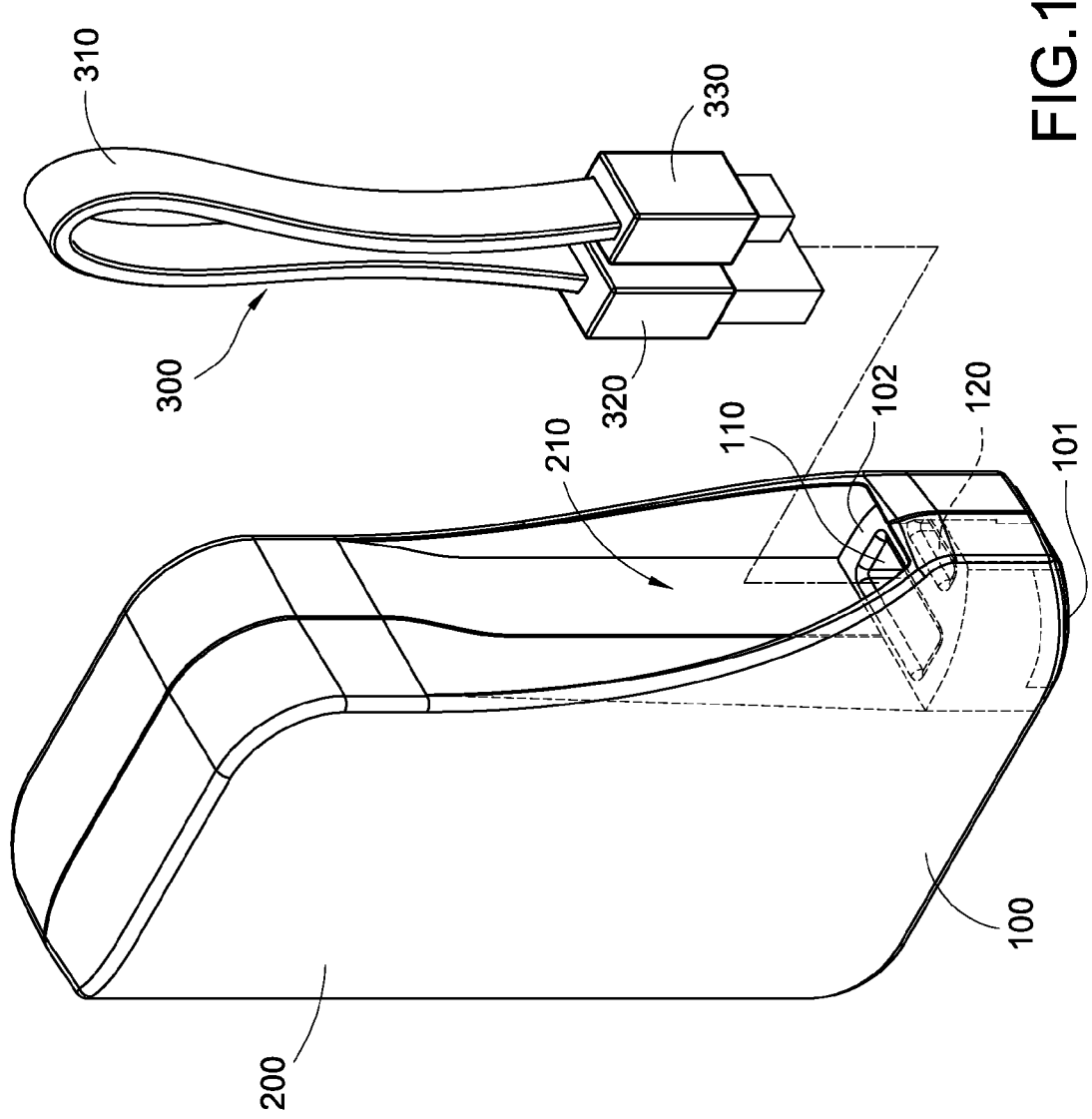
FIG. 1 is a perspective view of a mobile power supply apparatus in accordance with a first preferred embodiment of the present invention.

The technical contents of the present invention will become apparent with the detailed description of preferred embodiments accompanied with the illustration of related drawings as follows. It is noteworthy that same numerals are used for representing same respective elements in the drawings.

Figure 2:
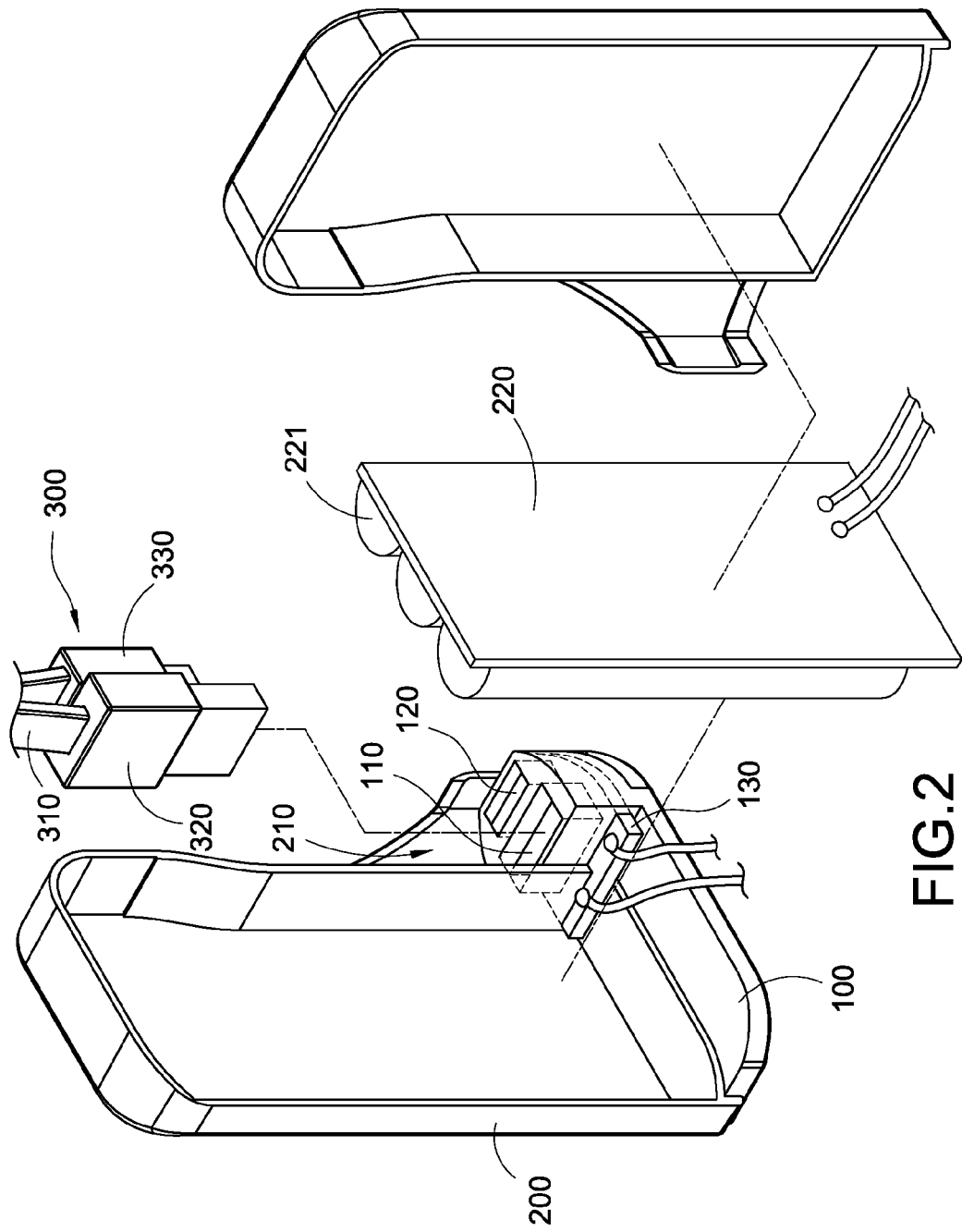
FIG. 2 is an exploded view of a mobile power supply apparatus in accordance with the first preferred embodiment of the present invention.

With reference to FIGS. 1 and 2 for a mobile power supply apparatus in accordance with the first preferred embodiment of the present invention, the mobile power supply apparatus comprises a base 100, a main body 200 and an electric wire 300.

The base 100 has a bottom side 101 and a top side 102 opposite to the bottom side 101, and the bottom side 101 is provided for attaching onto a plane on where the base 110 is put. The base 100 contains a first circuit board 130 installed therein, and the first circuit board 130 has a first socket 110 and a second socket 120 soldered thereon, and both first socket 110 and second socket 120 are exposed from the top side 102 of the base 100. The first socket 110 and the second socket 120 are of different specifications, and the first socket 110 and the second socket 120 are substantially in a rectangular shape, and the first socket 110 and the second socket 120 are arranged adjacent and parallel to one another. In this preferred embodiment, the first socket 110 is a USB connector socket, and the second socket 120 is a micro USB connector socket, but the present invention are not limited to such connector sockets only.

The main body 200 is extended from the top side 102 of the base 100, and a slot 210 is formed on a side of the main body 200, and the bottom of the slot 210 is interconnected to the top side 102 of the base 100, so that the first socket 110 and the second socket 120 can be accommodated at the bottom of the slot 210 to constitute a storage structure. The main body 200 contains a second circuit board 220 installed therein and a plurality of power storage units 221 installed on the second circuit board 220, and the second circuit board 220 is connected to the first circuit board 130 by soldering an electric wire, so that each power storage unit 221 is electrically coupled to the first socket 110 and the second socket 120.

The electric wire 300 includes a conductive wire 310, and a first plug 320 and a second plug 330 installed at both ends of the conductive wire 310 respectively, and the first plug 320 is plugged into the first socket 110, and the second plug 330 is plugged into the second socket 120. Wherein, the conductive wire 310 is substantially in a flat shape, so that the conductive wire 310 can maintain its external shape after being folded.

Figure 3:
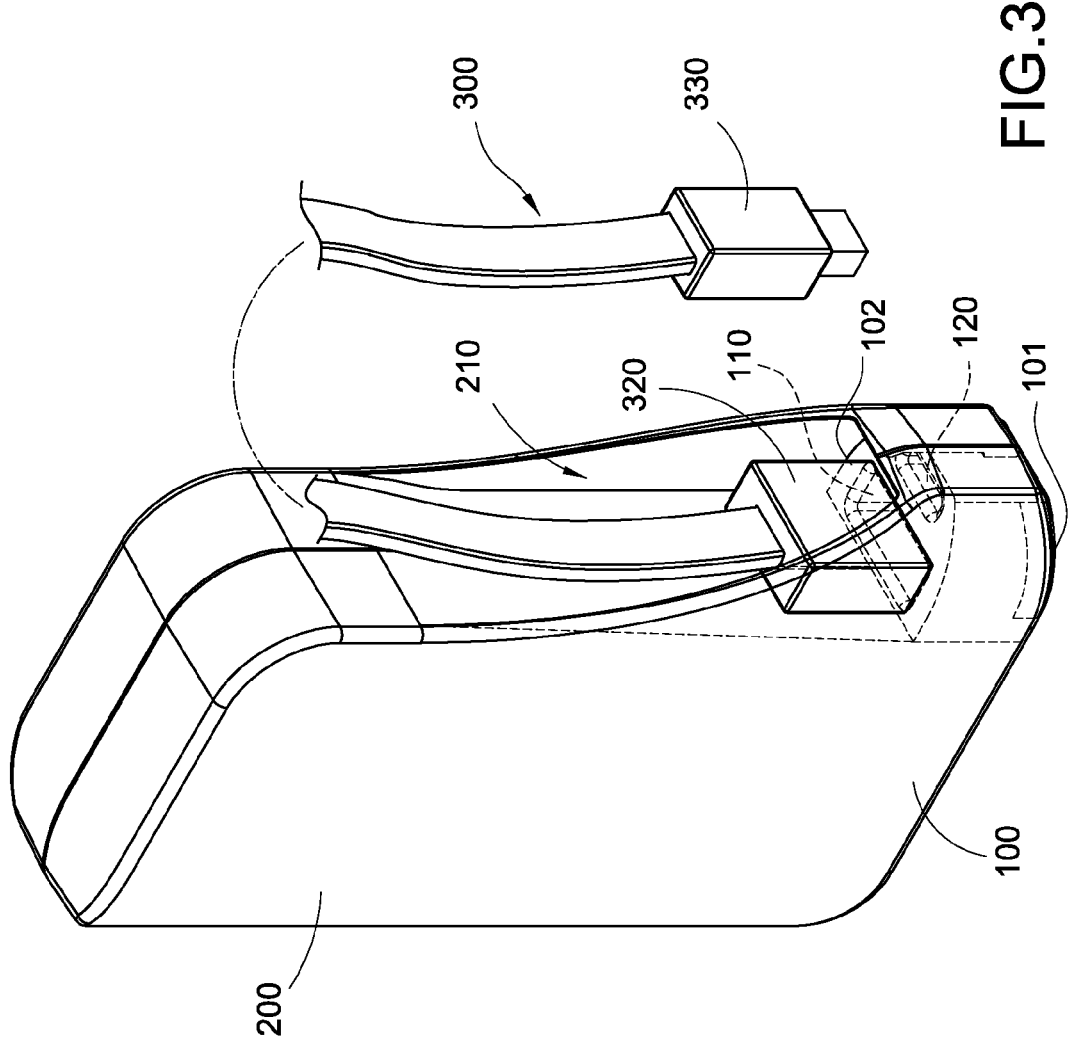
FIG. 3 is a schematic view of a using status of a mobile power supply apparatus in accordance with the present invention.

The first plug 320 and the second plug 330 are plugged into the first socket 110 and the second socket 120 respectively and arranged side by side with each other, and the conductive wire 310 may be folded and accommodated into the slot 210. Therefore, the mobile power supply apparatus of the present invention can store the electric wire 300 for a convenient carry. In FIG. 3, users simply pull out the first plug 320 or the second plug 330 and then plug in the first plug 320 or the second plug 330 to supply power to a mobile electronic device 400 from the mobile power supply apparatus of the present invention. Obviously, the application is very convenient.

Figure 4:
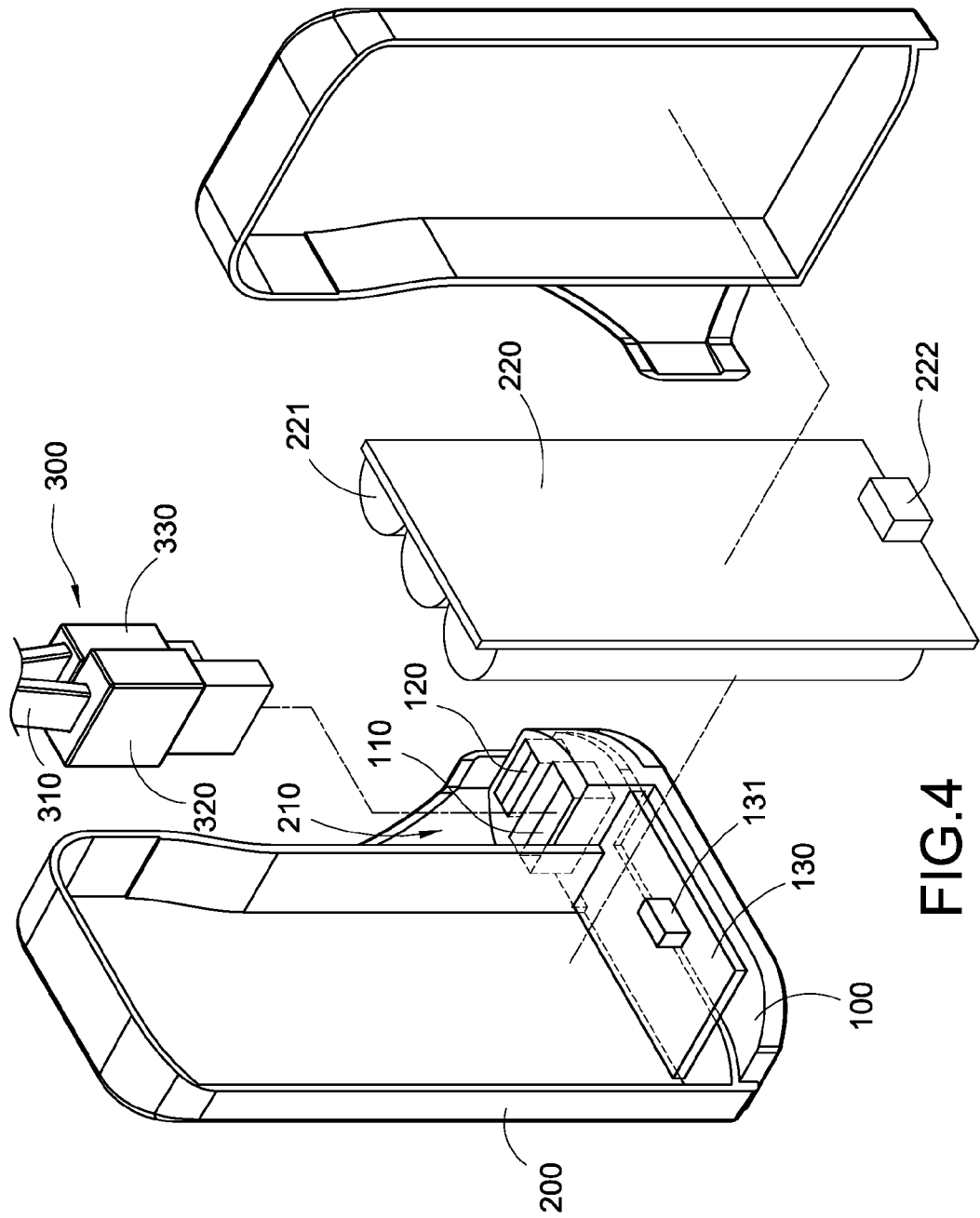
FIG. 4 is an exploded view of a mobile power supply apparatus in accordance with a second preferred embodiment of the present invention.

With reference to FIG. 4 for a mobile power supply apparatus in accordance with the second preferred embodiment of the present invention, the mobile power supply apparatus comprises a base 100, a main body 200 and an electric wire 300. The structure of this embodiment is substantially the same as the first preferred embodiment, except the following.

The main body 200 contains a first circuit board 130 installed therein, and the power storage units 221 are installed on the second circuit board 220, and the first circuit board 130 and the second circuit board 220 have a pair of corresponding joints 131/222 disposed thereon respectively, and the pair of joints 131/222 can be connected to electrically connect the first circuit board 130 with the second circuit board 220, and each power storage unit 221 is electrically coupled to first socket 110 and second socket 120.

Figure 5:
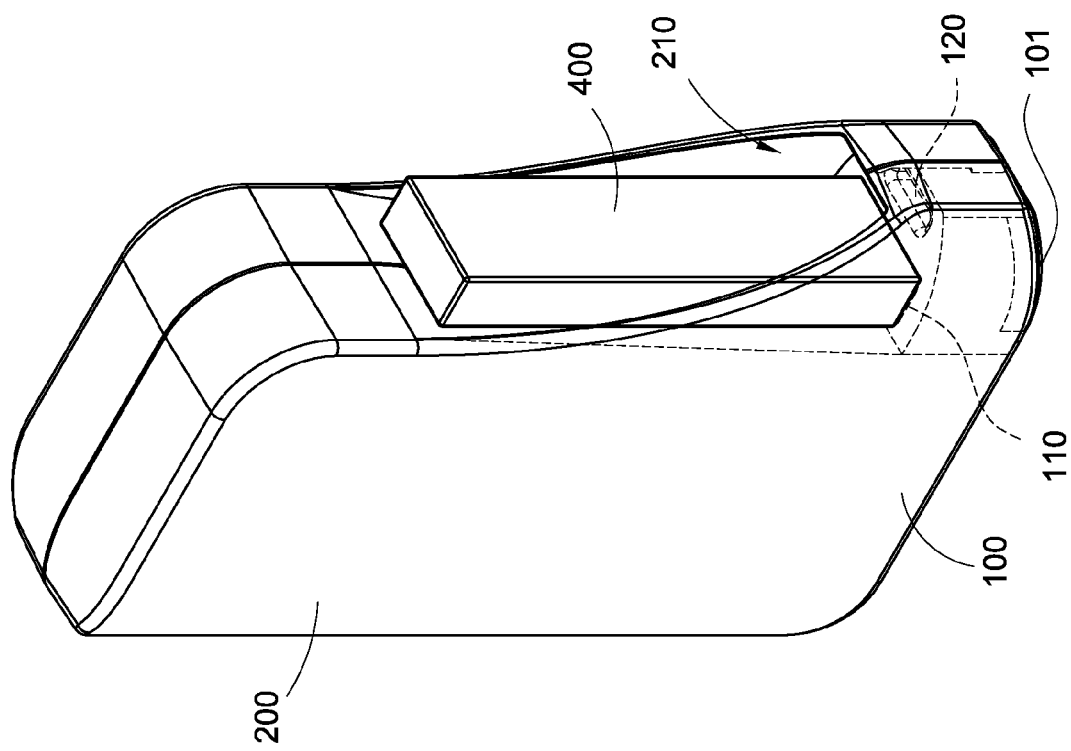
FIG. 5 is a schematic view of another using status of a mobile power supply apparatus in accordance with the present invention.

In FIG. 5, the mobile power supply apparatus of the present invention may be used for carrying an electronic device 400 and placed on a plane, while supplying power to the electronic device 400. For example, the first socket 110 may be plugged with an electronic device 400, such that the electronic device 400 is accommodated and fixed in the slot 210, and the electronic device 400 may be a lamp, a fan or an aromatic machine, but the present invention is not limited to the aforementioned electronic device 400 only. Therefore, the mobile power supply apparatus may be applied to the electronic devices 400 conveniently and does not occupy additional space.

In the mobile power supply apparatus of the present invention, the first socket 110 and the second socket 120 are accommodated at the bottom of the slot 210 to constitute a storage structure for storing the electric wire 300 or other electronic devices. Compared with the prior art, the mobile power supply apparatus of the present invention is easy-to-carry and has a broader scope of applicability.

While the invention has been described by means of specific embodiments, numerous modifications and variations could be made thereto by those skilled in the art without departing from the scope and spirit of the invention set forth in the claims.

What is claimed is:

1. A mobile power supply apparatus, comprising:
    a base, having a first socket and a second socket disposed adjacent to the first socket, and both sockets being exposed from a side of the base; and
    a main body, extending from the base and having a power storage unit installed therein, the power storage unit being electrically coupled to the first socket and the second socket; the main body, the first socket and the second socket being disposed on the same side of the base, and the main body having a slot formed thereon, and the first socket and the second socket being accommodated inside the slot; and
    an electric wire including a conductive wire, a first plug and a second plug installed at both ends of the conductive wire respectively; when the mobile power supply apparatus is not in use, the first plug is plugged into the first socket and the second plug is plugged into the second socket, so that the conductive wire is folded and stored into the slot; when the mobile power supply apparatus is in use, one of the first plug and the second plug is unplugged from the first socket or the second socket to be electrically connected to a mobile device.

2. The mobile power supply apparatus of claim 1, wherein the first socket and the second socket are of different specifications.

3. The mobile power supply apparatus of claim 1, wherein the first socket and the second socket are substantially in a rectangular shape, and arranged parallel to one another.

4. The mobile power supply apparatus of claim 1, wherein the base includes a first circuit board installed therein, and the first socket and the second socket are installed on the first circuit board, and the first circuit board is electrically coupled to the power storage unit.

5. The mobile power supply apparatus of claim 4, wherein the main body includes a second circuit board installed therein and electrically coupled to the first circuit board, and the power storage unit is installed on the second circuit board.

6. The mobile power supply apparatus of claim 1, wherein the first socket is plugged and connected to an electronic device.

7. The mobile power supply apparatus of claim 1, wherein the conductive wire is substantially in a flat shape.

* * * * *